United States Patent
Kuroishi

(10) Patent No.: US 9,483,106 B2
(45) Date of Patent: Nov. 1, 2016

(54) ELECTRONIC APPARATUS, POWER MANAGEMENT SYSTEM, AND NON-TRANSITORY COMPUTER READABLE MEDIUM STORING PROGRAM

(71) Applicant: FUJI XEROX CO., LTD., Tokyo (JP)

(72) Inventor: Kenji Kuroishi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 331 days.

(21) Appl. No.: 14/089,188

(22) Filed: Nov. 25, 2013

(65) Prior Publication Data
US 2014/0365800 A1    Dec. 11, 2014

(30) Foreign Application Priority Data
Jun. 11, 2013    (JP) .................................. 2013-122720

(51) Int. Cl.
G06F 1/32    (2006.01)
G03G 15/00   (2006.01)
H02J 9/00    (2006.01)

(52) U.S. Cl.
CPC ......... G06F 1/3293 (2013.01); G03G 15/5004 (2013.01); G03G 15/5087 (2013.01); H02J 9/005 (2013.01); Y02B 60/121 (2013.01); Y02B 60/32 (2013.01)

(58) Field of Classification Search
CPC ....... G02F 1/32; G02F 1/3293; G03G 15/50; G03G 15/5004; G03G 15/5087; H02J 13/00; H02J 3/00; H02J 9/005; Y02B 60/121; Y02B 60/32
See application file for complete search history.

(56) References Cited

U.S. PATENT DOCUMENTS

| | | | |
|---|---|---|---|
| 8,638,464 B2 * | 1/2014 | Kato | G06F 3/1229 358/1.15 |
| 9,122,216 B2 * | 9/2015 | Park | H04N 1/00896 |
| 2004/0004732 A1 * | 1/2004 | Takeda | G06K 15/00 358/1.13 |
| 2005/0007628 A1 | 1/2005 | Yamano et al. | |
| 2011/0228304 A1 * | 9/2011 | Kuwano | G03G 15/5004 358/1.13 |
| 2012/0155911 A1 | 6/2012 | Hirota | |
| 2012/0204050 A1 * | 8/2012 | Miyoshi | G06F 1/3203 713/323 |
| 2013/0057910 A1 * | 3/2013 | Matsumoto | G06K 15/402 358/1.15 |
| 2013/0088744 A1 | 4/2013 | Kodama | |

FOREIGN PATENT DOCUMENTS

| | | |
|---|---|---|
| JP | 2004-034488 A | 2/2004 |
| JP | 2005-041214 A | 2/2005 |
| JP | 2005-119203 A | 5/2005 |
| JP | B2-4358121 | 11/2009 |
| JP | 2012-133013 A | 7/2012 |
| JP | 2013-083789 A | 5/2013 |

OTHER PUBLICATIONS

Jul. 5, 2016 Office Action issued in Japanese Patent Application No. 2013-122720.

* cited by examiner

*Primary Examiner* — Fahmida Rahman
(74) *Attorney, Agent, or Firm* — Oliff PLC

(57) ABSTRACT

Provided is an electronic apparatus including a changing unit that changes control modes of the electronic apparatus including a first mode and a second mode, a first notification unit that notifies a management unit of circumstances of the electronic apparatus at a notification timing which is determined by the electronic apparatus or an external device when the control mode is the first mode, a recording unit that estimates the circumstances at a predicted notification timing and records the circumstances in a storage medium in advance before the changing unit changes the control mode to the second mode, and a second notification unit that notifies the management unit of the circumstances recorded by the recording unit at the notification timing when the control mode is the second mode.

20 Claims, 7 Drawing Sheets

ELECTRONIC APPARATUS, POWER MANAGEMENT SYSTEM, AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2013-122720 filed Jun. 11, 2013.

BACKGROUND (i) Technical Field

The present invention relates to an electronic apparatus, a power management system, and a non-transitory computer readable medium storing a program.

(ii) Related Art

Research and development of a technique for visualizing or managing power consumption with an energy management system such as a home energy management system (HEMS) or a building energy management system (BEMS) are in progress.

SUMMARY

According to an aspect of the invention, there is provided an electronic apparatus including:

a changing unit that changes control modes of the electronic apparatus including a first mode and a second mode;

a first notification unit that notifies a management unit of circumstances of the electronic apparatus at a notification timing which is determined by the electronic apparatus or an external device when the control mode is the first mode;

a recording unit that estimates the circumstances at a predicted notification timing and records the circumstances in a storage medium in advance before the changing unit changes the control mode to the second mode; and a second notification unit that notifies the management unit of the circumstances recorded by the recording unit at the notification timing when the control mode is the second mode.

BRIEF DESCRIPTION OF THE DRAWINGS

Exemplary embodiments of the present invention will be described in detail based on the following figures, wherein.

DETAILED DESCRIPTION

Exemplary Embodiment

Figure 1:
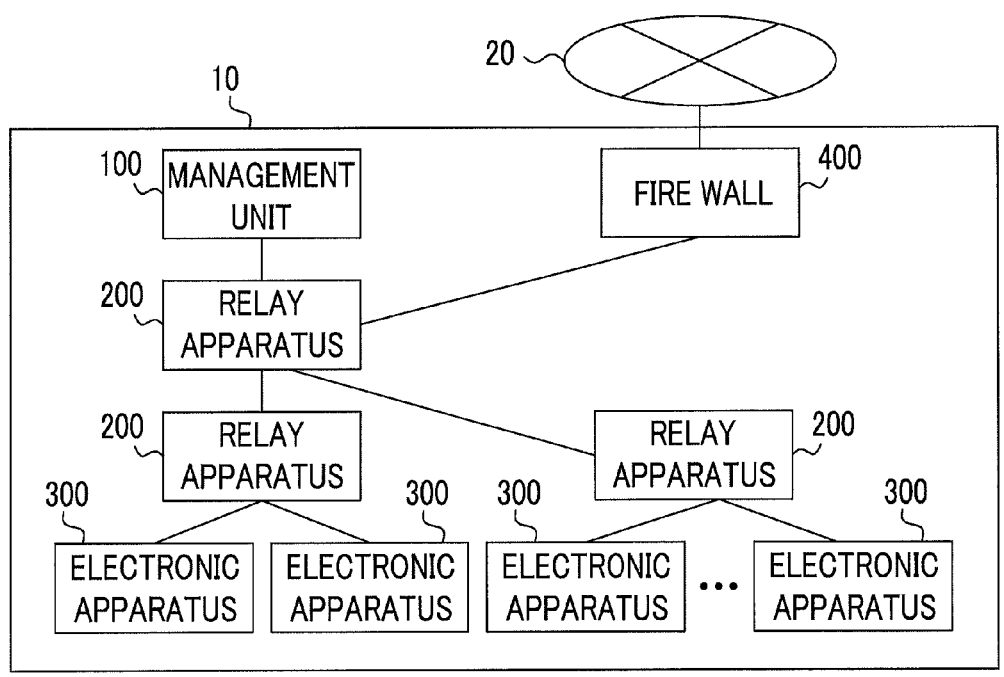
FIG. 1 is a block diagram illustrating an entire configuration of a power management system.

FIG. 1 is a block diagram illustrating an entire configuration of a power management system 10 according to an exemplary embodiment of the invention. The power management system 10 is a system which is formed using a local area network (LAN) installed in an office or a building, and is connected to an external network 20 such as the Internet. The power management system 10 includes at least a management unit 100, relay apparatuses 200, electronic apparatuses 300, and a fire wall 400.

In the present exemplary embodiment, these apparatuses and equipment forming the power management system 10 are assumed to be fitted to the energy management system such as the HEMS or BEMS. Communication in the power management system 10 is performed based on communication standards fitted to the energy management system, such as ECHONET Lite or IEEE1888.

The management unit 100 manages each apparatus in the power management system 10, and is a server unit in the power management system 10. The management unit 100 changes control modes of each apparatus in the power management system 10 or receives information (operation circumstance data described later) indicating circumstances of each apparatus.

The relay apparatus 200 relays communication between the management unit 100 and the electronic apparatus 300. The relay apparatus 200 is, for example, a router or a hub. In addition, the relay apparatus 200 is assumed to have a function of transmitting operation circumstance data described later in the same manner as in the electronic apparatus 300.

The electronic apparatus 300 is an apparatus which is a principal management object in the power management system 10. The electronic apparatus 300 is not limited to a specific apparatus but may be various apparatuses. The electronic apparatus 300 includes, for example, an air conditioning apparatus (a so-called air conditioner, or the like), an office apparatus (a facsimile apparatus, a copier, a printer, a personal computer, or the like), a home appliance (a refrigerator, a television set, or the like), an illumination apparatus, or the like.

The electronic apparatus 300 is operated in any one of plural control modes. Here, the control mode indicates an aspect of controlling the apparatus. The control modes of the electronic apparatus 300 at least include a "normal mode" and a "power saving mode". The power saving mode refers to a control mode in which power consumption is lower than in the normal mode, and is a mode in which a so-called sleep state occurs. The normal mode corresponds to a "first mode" in the invention, and the power saving mode corresponds to an example of a "second mode" in the invention.

The fire wall 400 controls access to the power management system 10 from the external network 20. The fire wall 400 allows or denies access from the external network 20 according to a predefined policy.

Figure 2:
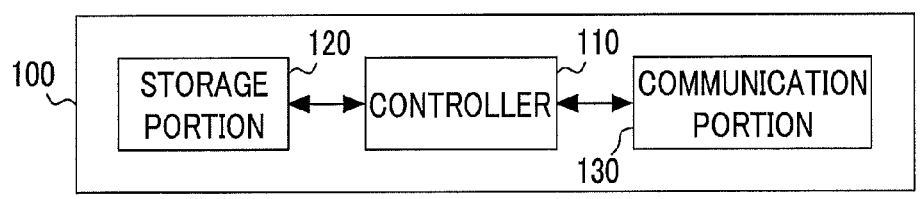
FIG. 2 is a block diagram illustrating a hardware configuration of a management unit.

FIG. 2 is a block diagram illustrating a hardware configuration of the management unit 100. The management unit 100 includes a controller 110, a storage portion 120, and a communication portion 130. The controller 110 controls an operation of each portion of the management unit 100. The controller 110 includes a processor such as a central processing unit (CPU) and a memory, and performs control by executing a program. The storage portion 120 stores data which is required by the controller 110. The storage portion 120 includes a storage medium such as a hard disk, and the controller 110 writes and reads data to and from the storage portion 120. The storage portion 120 stores topology information indicating a network configuration in the power management system 10. The management unit 100 may specify a connection manner of each apparatus by referring to the topology information. The communication portion 130 transmits and receives data to and from the electronic apparatus 300. The communication portion 130 includes a network interface card (NIC) or a modem, and performs a process necessary in data communication using the relay apparatus 200.

In addition, the management unit 100 may have a function of displaying the power consumption in the power management system 10, or may have a function of displaying power consumption on other apparatuses (a personal computer, a monitor, and the like) having a display. In addition, the "other apparatus" described here may be located in the LAN, or may be connected from outside the LAN via the external network 20.

Figure 3:
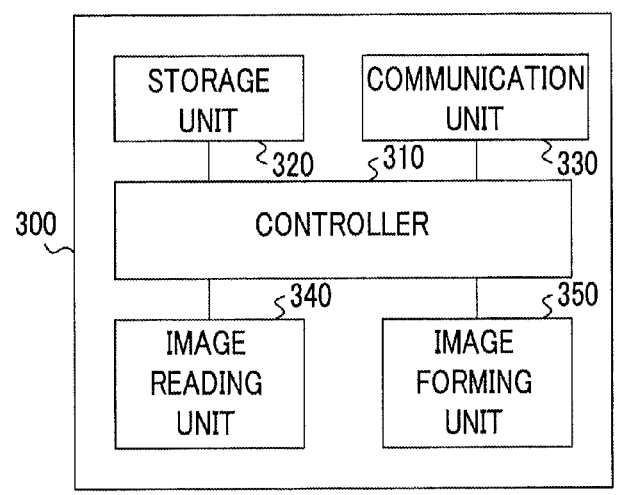
FIG. 3 is a block diagram illustrating an example of a hardware configuration of an electronic apparatus.

FIG. 3 is a block diagram illustrating an example of a hardware configuration of the electronic apparatus 300. As described above, the electronic apparatus 300 is not limited to a specific apparatus, and, here, as an example, a configuration example of a so-called multifunction machine will be described. The multifunction machine described here refers to an image forming apparatus having a scanning function of reading an original document and a facsimile function of performing facsimile communication.

The electronic apparatus 300 includes a controller 310, a storage unit 320, a communication unit 330, an image reading unit 340, and an image forming unit 350. The controller 310 controls an operation of each unit of the electronic apparatus 300. The controller 310 includes processors such as a CPU and an application specific integrated circuit (ASIC) and a memory, and performs control by executing a program. The storage unit 320 stores data. The storage unit 320 may store, for example, operation circumstance data described later. The communication unit 330 transmits and receives data to and from the management unit 100, to and from the other electronic apparatuses 300 or to and from the external network 20.

The image reading unit 340 optically reads an original document. The image reading unit 340 includes an imaging device such as a charge coupled device (CCD) image sensor, and generates image data representing an original document through photoelectric conversion. The image forming unit 350 forms an image corresponding to the image data. The image forming unit 350 forms an image on a recording medium (a sheet or the like), for example, through electrophotographic processes (charging, exposure, developing, transfer, and fixing). In addition, a recording type of the image forming unit 350 is not limited to an electrophotographic type, and may be an ink jet type or a thermal transfer type. Further, an image formed by the image forming unit 350 may be either of a monochrome image and a color image.

Figure 4:
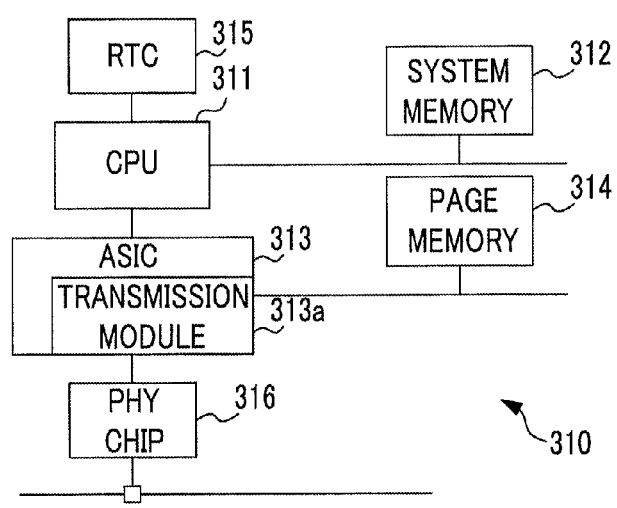
FIG. 4 is a block diagram illustrating a configuration example of a controller of the electronic apparatus.

FIG. 4 is a block diagram illustrating a configuration example of the controller 310 when the electronic apparatus 300 is an image forming apparatus. More specifically, the controller 310 includes a CPU 311, a system memory 312, an ASIC 313, a page memory 314, a real time clock (RTC) 315, and a physical layer (PHY) chip 316. In addition, the ASIC 313 has a transmission module 313a.

Both of the CPU 311 and the ASIC 313 perform processes. However, the CPU 311 and the ASIC 313 perform different processes. In the image forming apparatus, the CPU 311 principally performs a process related to control of the overall apparatus, but the ASIC 313 principally performs a process related to a specific application (here, an image process). The transmission module 313a forms a part of the ASIC 313, and has a function of transmitting operation circumstance data described later.

Both of the system memory 312 and the page memory 314 are volatile storage media. The system memory 312 is used by the CPU 311, and the page memory 314 is used by the ASIC 313. The page memory 314 is a memory which stores image data in the page unit. A storage region which stores a packet (hereinafter, referred to as a "notification packet") corresponding to operation circumstance data is secured in the page memory 314. In other words, the page memory 314 is also used as a packet buffer.

The RTC 315 has a clocking function of continuously clocking regardless of turning on and off of power of the overall electronic apparatus 300. The RTC 315 is used to specify the current time. The PHY chip 316 performs a process corresponding to a physical layer of an open systems interconnection (OSI) reference model.

The above description relates to a hardware configuration of the power management system 10. With this configuration, in the power management system 10, power consumption in the system (that is, a total amount of power consumption of the respective apparatuses) is managed by the management unit 100. The relay apparatus 200 and the electronic apparatus 300 transmit operation circumstance data indicating circumstances thereof to the management unit 100 as necessary. The management unit 100 collects operation circumstance data items transmitted from the respective apparatuses, and performs a process corresponding to the collection result.

In addition, the management unit 100 changes control modes of the electronic apparatus 300 when a certain condition is satisfied. The condition for changing the control modes is a condition in which, for example, power consumption in the system exceeds a predefined threshold value. Further, the management unit 100 may change the control modes of the electronic apparatus 300 when information indicating a state in which demand-supply of power is tight (or, conversely, a state in which demand-supply of power is tight is removed) is received from other apparatuses via the external network 20.

Figure 5:
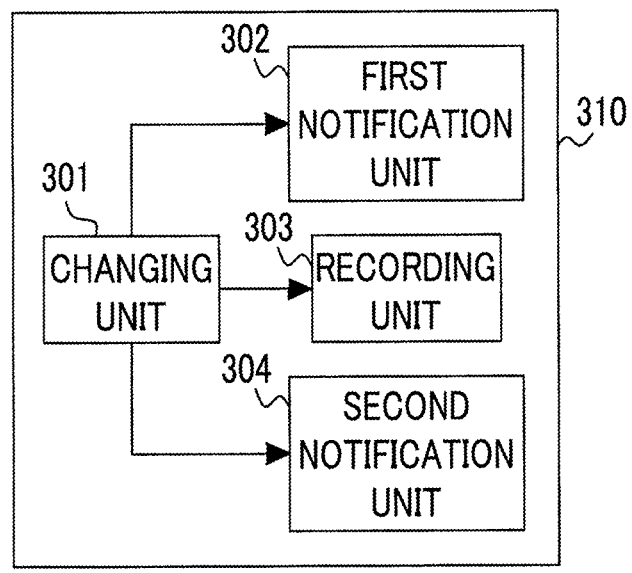
FIG. 5 is a block diagram illustrating a functional configuration of the electronic apparatus.

FIG. 5 is a block diagram illustrating a functional configuration of the electronic apparatus 300. The controller 310 of the electronic apparatus 300 implements a changing unit 301, a first notification unit 302, a recording unit 303, and a second notification unit 304. In addition, the changing unit 301, the first notification unit 302, and the recording unit 303 are implemented by the CPU 311, and the second notification unit 304 is implemented by the transmission module 313a of the ASIC 313.

The changing unit 301 changes the control modes of the electronic apparatus 300. The changing unit 301 changes the control modes in response to an instruction from the management unit 100. As an instruction from the management unit 100, there are an instruction for changing the control modes from the normal mode to the power saving mode and an instruction for changing the control modes from the power saving mode to the normal mode. These instructions are hereinafter referred to as "changing instructions".

The first notification unit 302 notifies the management unit 100 of circumstances of the electronic apparatus in the normal mode. The first notification unit 302 notifies the management unit 100 of circumstances of the electronic apparatus at a notification timing which is determined by the electronic apparatus or an external apparatus when a control mode thereof is the normal mode. Specifically, the first notification unit 302 transmits a notification packet including operation circumstance data via the communication unit 330 so as to notify the management unit 100 of circumstances thereof. The operation circumstance data at least includes data indicating a power value (the unit thereof is watts) which indicates power consumed by an operation of the electronic apparatus, and data indicating a time point. In addition, the operation circumstance data may include data or the like indicating an operation state of the electronic apparatus. Here, the operation state indicates turned-on and turned-off of a fixing device, turned-on and turned-off of a CPU, and the like, for example, when the electronic apparatus 300 is an electrophotographic image forming apparatus.

The recording unit 303 records circumstances of the electronic apparatus. The recording unit 303 estimates circumstances of the electronic apparatus at a predicted notification timing before a control mode thereof is changed to the power saving mode, and records a notification packet (that is, operation circumstance data) indicating the circumstances in a packet buffer (that is, the page memory 314) in advance. In other words, the recording unit 303 creates in advance a notification packet which will be transmitted in the power saving mode, and accumulates the notification packet in advance.

The second notification unit 304 notifies the management unit 100 of circumstances of the electronic apparatus in the power saving mode. The second notification unit 304 is similar to the first notification unit 302 in terms of notifying the management unit 100 of circumstances of the electronic apparatus, but is different from the first notification unit 302 in that control modes during operations are different from each other. In addition, the second notification unit 304 is also different from the first notification unit 302 in terms of notification of circumstances of the electronic apparatus by transmitting the notification packet which is recorded in the packet buffer in advance by the recording unit 303.

In addition, in the present exemplary embodiment, a notification sent by the second notification unit 304 is lower in power consumption than a notification sent by the first notification unit 302. This is because the notification sent by the second notification unit 304 is realized by the transmission module 313*a* of the ASIC 313, unlike the notification sent by the first notification unit 302, that is, the notification using the CPU 311. At this time, the CPU 311 is in a state in which power consumption is lower than in the normal mode since power thereof is turned off, or the like. Therefore, from the viewpoint of the entire controller 310, the notification of circumstances in the power saving mode is lower in power consumption than the notification of circumstances in the normal mode.

Figure 6:
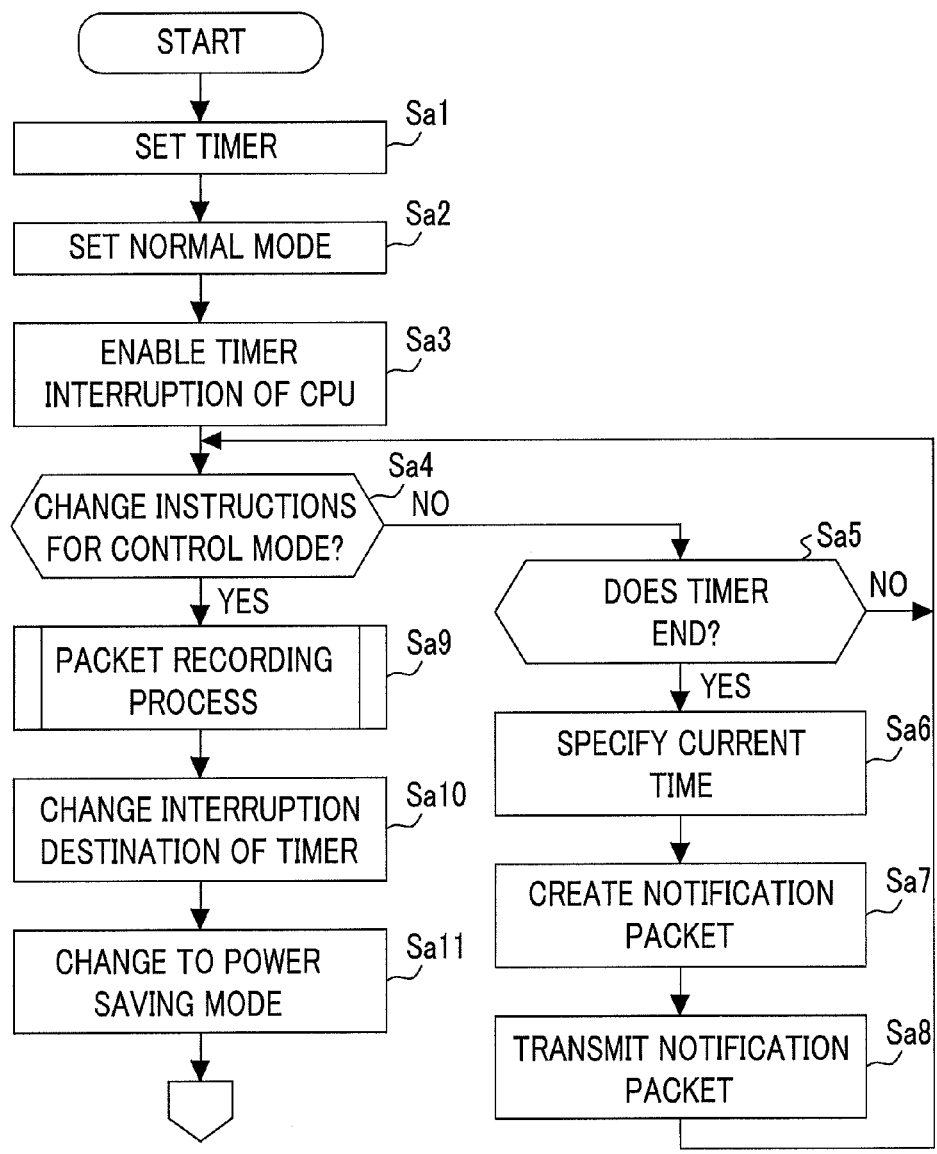
FIG. 6 is a flowchart illustrating a process performed by the electronic apparatus.
Figure 7:
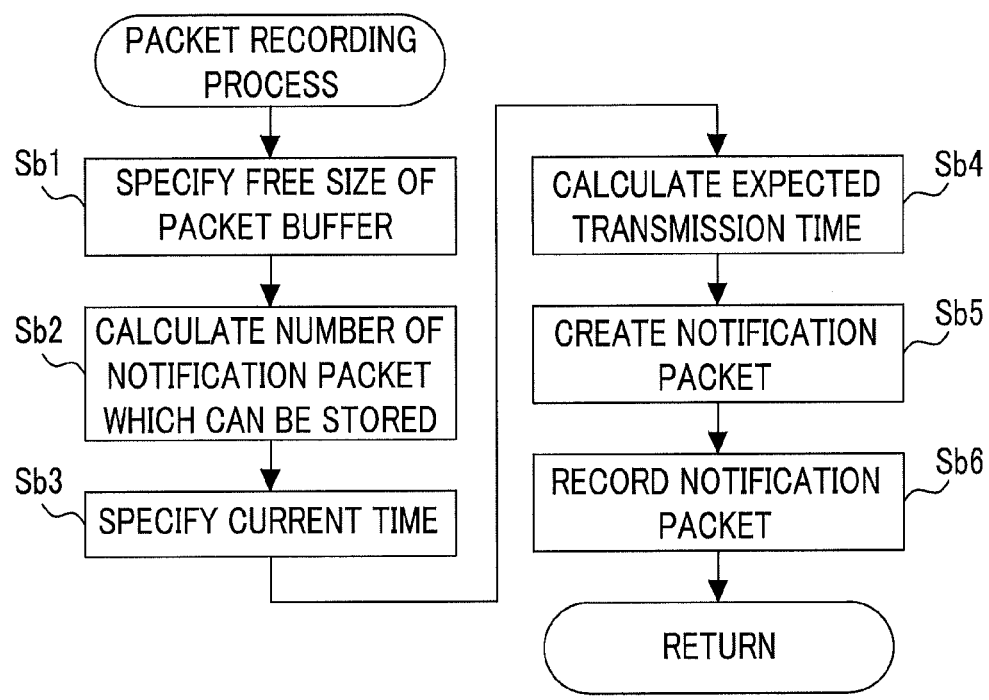
FIG. 7 is a flowchart illustrating a process (packet recording process) performed by the electronic apparatus.
Figure 8:
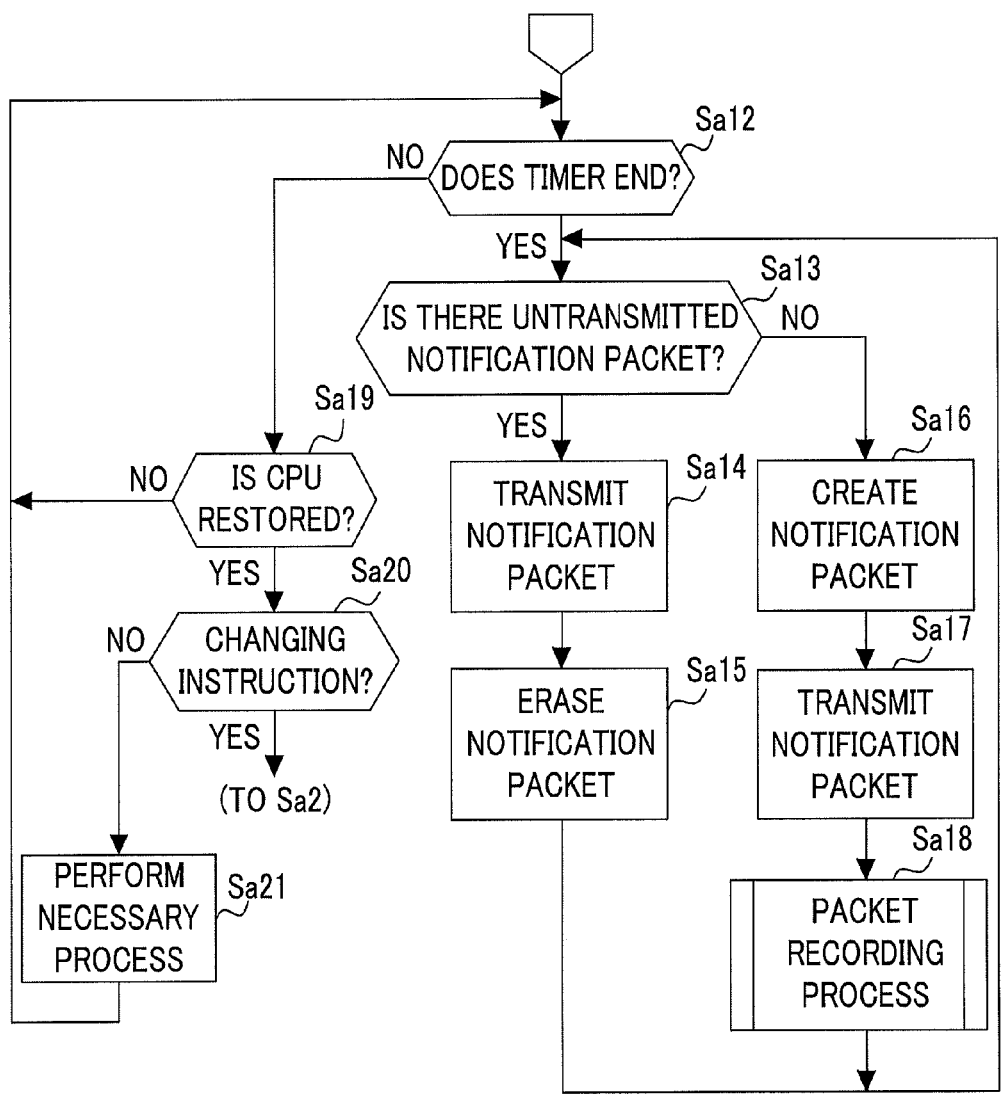
FIG. 8 is a flowchart illustrating a process (subsequent to FIG. 6) performed by the electronic apparatus.

FIGS. 6, 7 and 8 are flowcharts illustrating processes performed by the electronic apparatus 300. In addition, the following description relates to a process when a notification timing of a notification packet is set to a predefined time interval and this notification timing is determined on an electronic apparatus 300 side. Further, processes in the respective steps described below include processes which are principally performed by the CPU 311 and processes which are principally performed by the transmission module 313*a* of the ASIC 313.

First, the controller 310 sets a timer so as to transmit a notification packet with a predefined time interval (step Sa1). The time interval described here, that is, a notification timing is, for example, every five minutes, every ten minutes, or the like. Next, the controller 310 sets the normal mode as a control mode (step Sa2). Here, the controller 310 enables timer interruption of the CPU 311 (step Sa3).

From this state, the controller 310 is operated differently depending on presence or absence of a changing instruction from the management unit 100. The controller 310 is operated in the normal mode until a packet indicating a changing instruction is received. In other words, the controller 310 determines whether or not there is a changing instruction (step Sa4), and if there is no changing instruction, determines whether or not the time set in the timer has elapsed (step Sa5). If the time set in the timer has elapsed, a time point at that time (the current time) is specified (step Sa6). In addition, the controller 310 creates a notification packet (step Sa7) and transmits the notification packet via the communication unit 330 (step Sa8). The controller 310 repeatedly performs the processes in steps Sa4 to Sa8 until a packet indicating a changing instruction is received. That is, the controller continuously transmits the notification packet with the time interval set in the timer.

On the other hand, when a packet indicating a changing instruction is received, the controller 310 opens a region which is not used in the power saving mode among storage regions of the page memory 314 so as to secure the region as a region for recording the notification packet (step Sa9). For example, since the page memory 314 is not required to store image data in the power saving mode, the controller 310 opens in software a region which is secured in order to store image data in the normal mode, and thus makes the region enter a state which may be used as a packet buffer. In addition, the controller 310 may use the entire page memory 314 as a packet buffer.

Further, the controller 310 performs a process (step Sa9) of creating and recording a notification packet in advance before changing a control mode to the power saving mode, and changes an interruption destination of the timer from the CPU 311 to the transmission module 313*a* (step Sa10). In other words, the controller 310 disables timer interruption of the CPU 311 and enables timer interruption of the transmission module 313*a* of the ASIC 313. When this process is completed, the controller 310 changes the control mode from the normal mode to the power saving mode (step Sa11). Here, power of the CPU 311 is turned off.

FIG. 7 is a flowchart illustrating the process in step Sag (hereinafter, referred to as a "packet recording process") in more detail. Here, the controller 310 specifies a free size (capacity) of the packet buffer (step Sb1) and calculates the number of notification packets which may be stored in current free space on the basis of a packet size of the notification packet (step Sb2). Successively, the controller 310 specifies the current time (step Sb3) and calculates an expected transmission time of a notification packet in the future on the basis of the time interval set in the timer and a time point when a notification packet has been transmitted last (step Sb4). In step Sb4, the controller 310 calculates an expected transmission time corresponding to the number calculated in step Sb2. In addition, the controller 310 creates notification packets corresponding to the number thereof which may be stored in the current free space (step Sb5) and records the notification packets in the packet buffer (step Sb6).

In addition, the notification packet recorded in the packet buffer at least includes the expected transmission time calculated in step Sb4 and a power value (an estimated value thereof) at this time. Here, a power value in the power saving mode may be estimated in advance. Since the power saving mode is a control mode in which the CPU 311 is powered off and is continuously operated with minimum power consumption, a power value may be estimated by obtaining the minimum power consumption in advance.

Meanwhile, an operation subject up to step Sa11 (including the packet recording process) is the CPU 311. On the other hand, when the control mode is changed from the normal mode to the power saving mode in step Sa11, the CPU 311 is powered off, and an operation subject is changed to the transmission module 313a. FIG. 8 illustrates processes performed after a control mode is changed to the power saving mode and an operation subject is changed to the transmission module 313a.

As illustrated in FIG. 8, the controller 310 determines whether or not the time set in the timer has elapsed in the power saving mode (step Sa12), and determines whether or not there is an untransmitted notification packet in the packet buffer if the time set in the timer has elapsed (step Sa13). If there are untransmitted notification packets, the controller 310 transmits a notification packet of which the expected transmission time is the closest to the current time (step Sa14) and erases the transmitted packet from the packet buffer (step Sa15). The controller 310 repeatedly performs the processes in steps Sa12 to Sa15 as long as there is an untransmitted notification packet.

On the other hand, if it is determined that there is no untransmitted notification packet in step Sa13, the controller 310 temporarily restores the CPU 311 in order to create a packet again. The controller 310 performs creation of a notification packet to be transmitted (step Sa16) and transmission thereof (step Sa17), and performs a packet recording process as in step Sa9 by using the CPU 311, thereby creating and recording in advance a notification packet necessary thereafter for supplementation (step Sa18). If the packet recording process is completed, the controller 310 powers off the CPU 311 and repeatedly performs the processes in step Sa12 and the subsequent steps. In addition, the packet recording process in step Sa18 is not necessarily performed, and the CPU 311 may create a notification packet on all such occasions.

In addition, if the time set in the timer has not elapsed in step Sa12, the controller 310 determines whether or not interruption for restoring the CPU 311 has occurred (step Sa19). If the interruption has not occurred, the controller 310 performs the determination in step Sa12, and performs a process corresponding to content of the interruption if the interruption has occurred. Here, the controller 310 determines whether or not the interruption is a changing instruction for a control mode (step Sa20), and if the interruption is a changing instruction, the controller performs the process in step Sa2, that is, performs setting for changing the control mode from the power saving mode to the normal mode, and performs the processes in step Sa3 and the subsequent steps again. Further, also if an interruption other than the changing instruction has occurred, the controller 310 performs a process corresponding to content of each interruption (step Sa21). For example, at this time, the controller 310 determines whether or not a received packet is a packet which requires a response made by the electronic apparatus, and makes a response as necessary.

In addition, a notification timing may be set in the management unit 100 (not the electronic apparatus 300 side). In this case, the management unit 100 transmits to the electronic apparatus 300 a packet (hereinafter, referred to as a "notification request packet") for requesting a notification packet. The electronic apparatus 300 may perform the processes illustrated in FIGS. 6, 7 and 8 by using the notification request packet instead of the timer as a trigger.

In addition, in this case, the electronic apparatus 300 may estimate an expected transmission time on the basis of a reception interval of the notification request packet.

Through the above-described operation, the electronic apparatus 300 records a notification packet in advance, and thus a frequency in which the CPU 311 transmits a notification packet is smaller than in a case where the transmission module 313a does not transmit a notification packet. In addition, transmission of a notification packet by the transmission module 313a (in other words, notification of circumstances of the electronic apparatus) is lower in power consumption than in a case where transmission of a notification packet is performed in a state in which the CPU 311 is powered on. Therefore, the electronic apparatus 300 records a notification packet in advance, and thus power consumption is lower than in a case where the transmission module 313a does not transmit a notification packet.

Modification Examples

An exemplary embodiment of the invention is not limited to the above-described exemplary embodiment, and may have, for example, forms shown in the following modification examples. In addition, these modification examples may be combined with each other as necessary, by using the modification examples together or replacing some thereof.

Modification Example 1

The electronic apparatus 300 may have modes other than the normal mode and the power saving mode as a control mode. For example, the electronic apparatus 300 may have three or more kinds of control modes, so as to control an extent of suppressing power consumption more in stages.

Modification Example 2

In an exemplary embodiment of the invention, a storage medium which functions as a packet buffer is not limited to a page memory. A storage medium which functions as a packet buffer may be different depending on an operation subject in the power saving mode, and there may be various functions in the normal mode.

Figure 9:
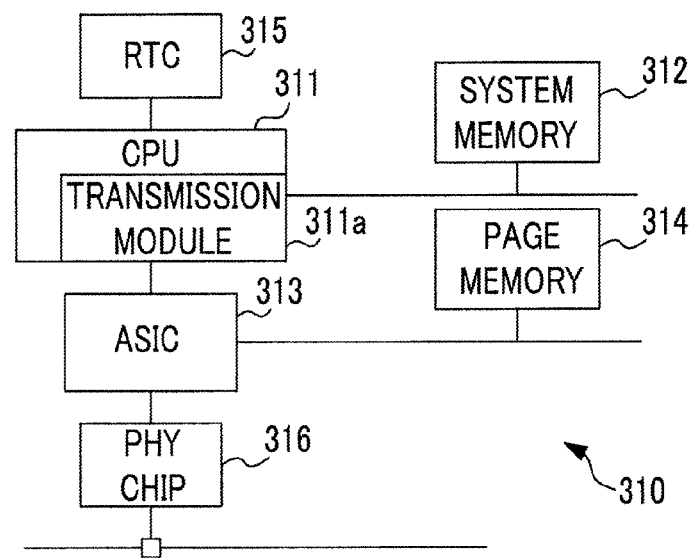
FIG. 9 is a block diagram illustrating a configuration example of the controller of the electronic apparatus.

FIG. 9 is a block diagram illustrating another configuration example of the controller 310. The controller 310 has a configuration different from the configuration illustrated in FIG. 4 in that, instead of the transmission module 313a of the ASIC 313, a transmission module 311a is provided in the CPU 311 and has a configuration similar to the configuration illustrated in FIG. 4 except for the fact. In addition, in this example, the system memory 312 instead of the page memory 314 functions as a packet buffer. In this example, the controller 310 is configured so that, when a control mode is the power saving mode, the CPU 311 stops its function except for that of the transmission module 311a, and the transmission module 311a transmits a notification packet. Also in this configuration, the controller 310 has lower power consumption in the power saving mode than in the normal mode.

In addition, a storage medium in an exemplary embodiment of the invention may be a dedicated storage medium which is secured in a packet buffer, but, as in the above-described exemplary embodiment, it is more preferable that among regions used for a predefined function (a function of storing image data) in the normal mode, a region which is not used in the power saving mode may be used.

Modification Example 3

Operation circumstance data may include information which is a basis of calculation of a power value instead of an actual power value. In other words, the operation circumstance data may include at least information which allows power consumption to be calculated. In addition, when the electronic apparatus 300 is an illumination apparatus which may adjust brightness, information indicating set brightness may be included in operation circumstance data, and, when the electronic apparatus 300 is an air conditioning apparatus, a set temperature, room temperature, the strength of wind, and the like may be included in operation circumstance data. In this case, the management unit 100 may calculate an actual power value on the basis of the operation circumstance data.

Modification Example 4

The management unit 100 may not receive operation circumstance data from all apparatuses which are management objects. For example, when there is an electronic apparatus 300 of which power consumption during an operation scarcely changes, and a power value may be nearly accurately predicted, operation circumstance data may not be received and a power value may be predicted. For example, in relation to the relay apparatus 200, operation circumstance data may be transmitted or a power value may be predicted in the same manner as in the electronic apparatus 300.

Modification Example 5

The invention may be provided as a program for causing a computer to realize the function of an electronic apparatus related to the invention, and may be provided in a form of a recording medium recording the program. In addition, the program related to the invention may be acquired from an external device via a network or other communication units, and may be downloaded to the electronic apparatus.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An electronic apparatus comprising:
    a changing unit that changes control modes of the electronic apparatus including a first mode and a second mode based on receiving instructions from a management unit;
    a first notification unit that notifies the management unit of circumstances of the electronic apparatus at a notification timing which is determined by the electronic apparatus or an external device when the control mode is the first mode, the first notification unit notifying the management unit by transmitting a notification packet which includes operation circumstance data of the electronic apparatus, the operation circumstance data including at least data indicating power consumed by operation of the electronic apparatus and a current time point;
    a recording unit that estimates the circumstances at a predicted notification timing and records the circumstances as the notification packet in a storage medium in advance before the changing unit changes the control mode to the second mode, the notification packet including an expected transmission time and an estimated power value at the expected transmission time; and
    a second notification unit that notifies the management unit of the circumstances recorded by the recording unit at the notification timing when the control mode is the second mode, the notification packet recorded in advance in the storage medium being transmitted by the second notification unit to the management unit during the second mode, wherein the second mode is a power saving mode.

2. The electronic apparatus according to claim 1, wherein when the control mode is the second mode, and a notification of the circumstances recorded in the storage medium in advance has been sent, the recording unit estimates the subsequent circumstances and records the circumstances in the storage medium.

3. The electronic apparatus according to claim 1, wherein the recording unit supplements the circumstances when the changing unit changes the control mode to the first mode and there is free space in the storage medium.

4. The electronic apparatus according to claim 2, wherein the recording unit supplements the circumstances when the changing unit changes the control mode to the first mode and there is free space in the storage medium.

5. The electronic apparatus according to claim 1, wherein the notification sent by the second notification unit is lower in power consumption than the notification sent by the first notification unit.

6. The electronic apparatus according to claim 2, wherein the notification sent by the second notification unit is lower in power consumption than the notification sent by the first notification unit.

7. The electronic apparatus according to claim 3, wherein the notification sent by the second notification unit is lower in power consumption than the notification sent by the first notification unit.

8. The electronic apparatus according to claim 4, wherein the notification sent by the second notification unit is lower in power consumption than the notification sent by the first notification unit.

9. The electronic apparatus according to claim 1, wherein the second notification unit is different from the first notification unit in an operation subject.

10. The electronic apparatus according to claim 2, wherein
    the second notification unit is different from the first notification unit in an operation subject.

11. The electronic apparatus according to claim 3, wherein
    the second notification unit is different from the first notification unit in an operation subject.

12. The electronic apparatus according to claim 4, wherein
    the second notification unit is different from the first notification unit in an operation subject.

13. The electronic apparatus according to claim 5, wherein the second notification unit is different from the first notification unit in an operation subject.

14. The electronic apparatus according to claim 6, wherein
the second notification unit is different from the first notification unit in an operation subject.

15. The electronic apparatus according to claim 7, wherein
the second notification unit is different from the first notification unit in an operation subject.

16. The electronic apparatus according to claim 8, wherein
the second notification unit is different from the first notification unit in an operation subject.

17. The electronic apparatus according to claim 1, wherein
the storage medium is a storage medium for realizing a predefined function in the first mode, and
the recording unit opens a region which is not used in the second mode in the storage medium and records the circumstances in the region.

18. The electronic apparatus according to claim 2, wherein
the storage medium is a storage medium for realizing a predefined function in the first mode, and
the recording unit opens a region which is not used in the second mode in the storage medium and records the circumstances in the region.

19. A power management system comprising:
the electronic apparatus according to claim 1; and
the management unit performing a process on the basis of circumstances of the electronic apparatus of which a notification is sent by the electronic apparatus.

20. A non-transitory computer readable medium storing a program causing a computer of an electronic apparatus to function as a controller that controls:
a changing unit that changes control modes of the electronic apparatus based on receiving instructions from a management unit;
a first notification unit that notifies the management unit of circumstances of the electronic apparatus at a notification timing which is determined by the electronic apparatus or an external device when the control mode is a first mode, the first notification unit notifying the management unit by transmitting a notification packet which includes operation circumstance data of the electronic apparatus, the operation circumstance data including at least data indicating power consumed by operation of the electronic apparatus and a current time point;
a recording unit that estimates the circumstances at a predicted notification timing and records the circumstances as the notification packet in a storage medium in advance before the changing unit changes the control mode from the first mode, the value at the expected transmission time; and
a second notification unit that notifies the management unit of the circumstances recorded by the recording unit at the notification timing when the control mode is a second mode that is a power saving mode, the notification packet recorded in advance in the storage medium being transmitted by the second notification unit to the management unit during the second mode.

* * * * *